(12) United States Patent
Andreev et al.

(10) Patent No.: US 7,269,599 B2
(45) Date of Patent: Sep. 11, 2007

(54) METHOD AND SYSTEM FOR PREDICTING USER ACTIVITY LEVELS ASSOCIATED WITH AN APPLICATION

(75) Inventors: Dmitry Andreev, Port Chester, NY (US); Paul Gregory Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/292,182

(22) Filed: Dec. 1, 2005

(65) Prior Publication Data

US 2007/0130097 A1    Jun. 7, 2007

(51) Int. Cl.
  G06F 17/30    (2006.01)
  G06F 17/00    (2006.01)
(52) U.S. Cl. .................... 707/102; 706/45; 706/46; 726/22; 709/224
(58) Field of Classification Search ............. 706/45, 706/46; 726/22; 709/224; 707/3, 101, 102
See application file for complete search history.

(56) References Cited

U.S. PATENT DOCUMENTS

| 5,301,320 | A |  | 4/1994 | McAtee et al. ................ 705/9 |
| 5,890,133 | A |  | 3/1999 | Ernst ............................. 705/7 |
| 6,820,070 | B2 | * | 11/2004 | Goldman et al. ............. 706/46 |
| 2002/0016785 | A1 | * | 2/2002 | Sirgany ........................ 706/46 |
| 2002/0049687 | A1 | * | 4/2002 | Helsper et al. ............... 706/45 |
| 2002/0152305 | A1 |  | 10/2002 | Jackson et al. ............. 709/224 |
| 2002/0194251 | A1 | * | 12/2002 | Richter et al. .............. 709/105 |
| 2003/0177160 | A1 |  | 9/2003 | Chiu et al. .................. 718/100 |
| 2004/0181794 | A1 |  | 9/2004 | Coleman et al. ............ 718/104 |
| 2005/0152390 | A1 | * | 7/2005 | Schroeder et al. ........... 370/432 |
| 2005/0183143 | A1 | * | 8/2005 | Anderholm et al. ......... 726/22 |
| 2006/0184482 | A1 | * | 8/2006 | Flinn et al. .................. 706/45 |

FOREIGN PATENT DOCUMENTS

WO    WO 0173588 A2    12/2001

OTHER PUBLICATIONS

Ross, Sheldon M.; Introduction to Probability and Statistics for Engineers and Scientists; Elsevier Academic Press; pp. 36 and 391-399.

* cited by examiner

*Primary Examiner*—Pierre Vital
*Assistant Examiner*—Ann J Chempakaseril
(74) *Attorney, Agent, or Firm*—Schmeiser, Olsen & Watts; William E. Schiesser

(57) ABSTRACT

A method and system for predicting a user activity level associated with an application. An activity level is a number of transactions performed by users utilizing the application per time period or a number of users utilizing the application per time period. Measurements of activity levels are assigned to a user activity metric (UAM) variable, and associated values are assigned to a set of factors. At least one correlation coefficient between each factor and the UAM is calculated. In response to a maximum correlation coefficient associated with a factor being less than a pre-defined threshold, the factor is excluded from the set of factors to facilitate forming a subset of factors associated with correlation coefficients whose absolute values are greater than or equal to the pre-defined threshold. A regression model utilizing the subset is generated to predict an activity level.

30 Claims, 4 Drawing Sheets

METHOD AND SYSTEM FOR PREDICTING
USER ACTIVITY LEVELS ASSOCIATED
WITH AN APPLICATION

TECHNICAL FIELD

The present invention relates to predicting user activity levels associated with an application in a multi-user computing environment, and more particularly to predicting user activity levels in a web application environment by employing correlation and regression analysis.

BACKGROUND OF THE INVENTION

In hosted web applications, usage of resources (e.g., central processor unit, random access memory, disk, and network) can change significantly in response to the activity of end users at any given point in time. Furthermore, web applications are known to attain a non-recoverable application server error state under a user activity level exceeding an application-specific threshold. Conventional infrastructure and application provisioning processes can make additional resources (e.g., servers) available, but these provisioning processes require a considerable lead-time (e.g., several hours). This deficiency in conventional provisioning approaches renders impracticable a reactive approach to resource provisioning under increased user activity levels. Moreover, known forecasting techniques for resource utilization are limited by inadequate reliability. Accordingly, there exists a need in the art to overcome the deficiencies and limitations described hereinabove.

SUMMARY OF THE INVENTION

In first embodiments, the present invention provides a method of predicting a user activity level associated with an application executing on a computing system in a multi-user computing environment, the method comprising:

defining a user activity metric (UAM) as a variable associated with a plurality of activity levels, wherein each activity level of the plurality of activity levels is a number of transactions performed by a plurality of users utilizing the application during a time period of a plurality of time periods, or a number of the users utilizing the application during the time period;

defining a plurality of factors associated with the UAM;

assigning a plurality of measurements to the UAM, wherein each measurement of the plurality of measurements is one activity level of the plurality of activity levels;

assigning a plurality of values to a factor of the plurality of factors, the plurality of values associated with the plurality of measurements in a one-to-one correspondence, and with the plurality of time periods in a one-to-one correspondence;

calculating at least one coefficient of correlation between at least two values of the plurality of values and at least two measurements of the plurality of measurements;

determining a maximum coefficient of correlation of the at least one coefficient of correlation that is less than a pre-defined threshold value;

excluding, in response to the determining, the factor from the plurality of factors to facilitate forming a subset of the plurality of factors, the subset including one or more factors, wherein an absolute value of a coefficient of correlation between any factor of the one or more factors and the UAM is greater than or equal to the pre-defined threshold value; and generating a regression model to predict an activity level, the regression model based on the plurality of measurements and the subset.

In second embodiments, the present invention provides a system for predicting a user activity level associated with an application executing on a computing system in a multi-user computing environment, the system comprising:

means for defining a user activity metric (UAM) as a variable associated with a plurality of activity levels, wherein each activity level of the plurality of activity levels is a number of transactions performed by a plurality of users utilizing the application during a time period of a plurality of time periods, or a number of the users utilizing the application during the time period;

means for defining a plurality of factors associated with the UAM;

means for assigning a plurality of measurements to the UAM, wherein each measurement of the plurality of measurements is one activity level of the plurality of activity levels;

means for assigning a plurality of values to a factor of the plurality of factors, the plurality of values associated with the plurality of measurements in a one-to-one correspondence, and with the plurality of time periods in a one-to-one correspondence;

means for calculating at least one coefficient of correlation between at least two values of the plurality of values and at least two measurements of the plurality of measurements;

means for determining a maximum coefficient of correlation of the at least one coefficient of correlation that is less than a pre-defined threshold value;

means for excluding, in response to the determining, the factor from the plurality of factors to facilitate forming a subset of the plurality of factors, the subset including one or more factors, wherein an absolute value of a coefficient of correlation between any factor of the one or more factors and the UAM is greater than or equal to the pre-defined threshold value; and means for generating a regression model to predict an activity level, the regression model based on the plurality of measurements and the subset.

In third embodiments, the present invention provides a computer program product comprising a computer-usable medium including computer-usable program code for predicting a user activity level associated with an application executing on a computing system in a multi-user computing environment, the computer program product including:

computer-usable code for defining a user activity metric (UAM) as a variable associated with a plurality of activity levels, wherein each activity level of the plurality of activity levels is a number of transactions performed by a plurality of users utilizing the application during a time period of a plurality of time periods, or a number of the users utilizing the application during the time period;

computer-usable code for defining a plurality of factors associated with the UAM;

computer-usable code for assigning a plurality of measurements to the UAM, wherein each measurement of the plurality of measurements is one activity level of the plurality of activity levels;

computer-usable code for assigning a plurality of values to a factor of the plurality of factors, the plurality of values associated with the plurality of measurements in a one-to-one correspondence, and with the plurality of time periods in a one-to-one correspondence;

computer-usable code for calculating at least one coefficient of correlation between at least two values of the plurality of values and at least two measurements of the plurality of measurements;

computer-usable code for determining a maximum coefficient of correlation of the at least one coefficient of correlation that is less than a pre-defined threshold value;

computer-usable code for excluding, in response to the determining, the factor from the plurality of factors to facilitate forming a subset of the plurality of factors, the subset including one or more factors, wherein an absolute value of a coefficient of correlation between any factor of the one or more factors and the UAM is greater than or equal to the pre-defined threshold value; and computer-usable code for generating a regression model to predict an activity level, the regression model based on the plurality of measurements and the subset.

In fourth embodiments, the present invention provides a method for deploying computing infrastructure, comprising integrating computer-readable code into a computing system, wherein the code in combination with the computing system is capable of performing a process of predicting a user activity level associated with an application executing on a computing system in a multi-user computing environment, the process comprising:

defining a user activity metric (UAM) as a variable associated with a plurality of activity levels, wherein each activity level of the plurality of activity levels is a number of transactions performed by a plurality of users utilizing the application during a time period of a plurality of time periods, or a number of the users utilizing the application during the time period;

defining a plurality of factors associated with the UAM;

assigning a plurality of measurements to the UAM, wherein each measurement of the plurality of measurements is one activity level of the plurality of activity levels;

assigning a plurality of values to a factor of the plurality of factors, the plurality of values associated with the plurality of measurements in a one-to-one correspondence, and with the plurality of time periods in a one-to-one correspondence;

calculating at least one coefficient of correlation between at least two values of the plurality of values and at least two measurements of the plurality of measurements;

determining a maximum coefficient of correlation of the at least one coefficient of correlation that is less than a pre-defined threshold value;

excluding, in response to the determining, the factor from the plurality of factors to facilitate forming a subset of the plurality of factors, the subset including one or more factors, wherein an absolute value of a coefficient of correlation between any factor of the one or more factors and the UAM is greater than or equal to the pre-defined threshold value; and generating a regression model to predict an activity level, the regression model based on the plurality of measurements and the subset.

Advantageously, the present invention provides a technique for correlating user activity levels with deterministic factors to generate a statistical model that reliably predicts user activity levels to facilitate a proactive provisioning of hardware resources.

BEST MODE FOR CARRYING OUT THE INVENTION

The present invention provides a technique for predicting an activity level (a.k.a. user activity level or user load) at a particular time in the future. The user activity level is associated with end users of an application executing in a multi-user computing environment. The user activity level prediction technique is supported by a statistical model based upon historical data values of a plurality of measurable, deterministic factors. Real-time data associated with the factors is input into the statistical model to predict future user activity levels, which are used to reallocate hardware resources related to the application.

Figure 1:
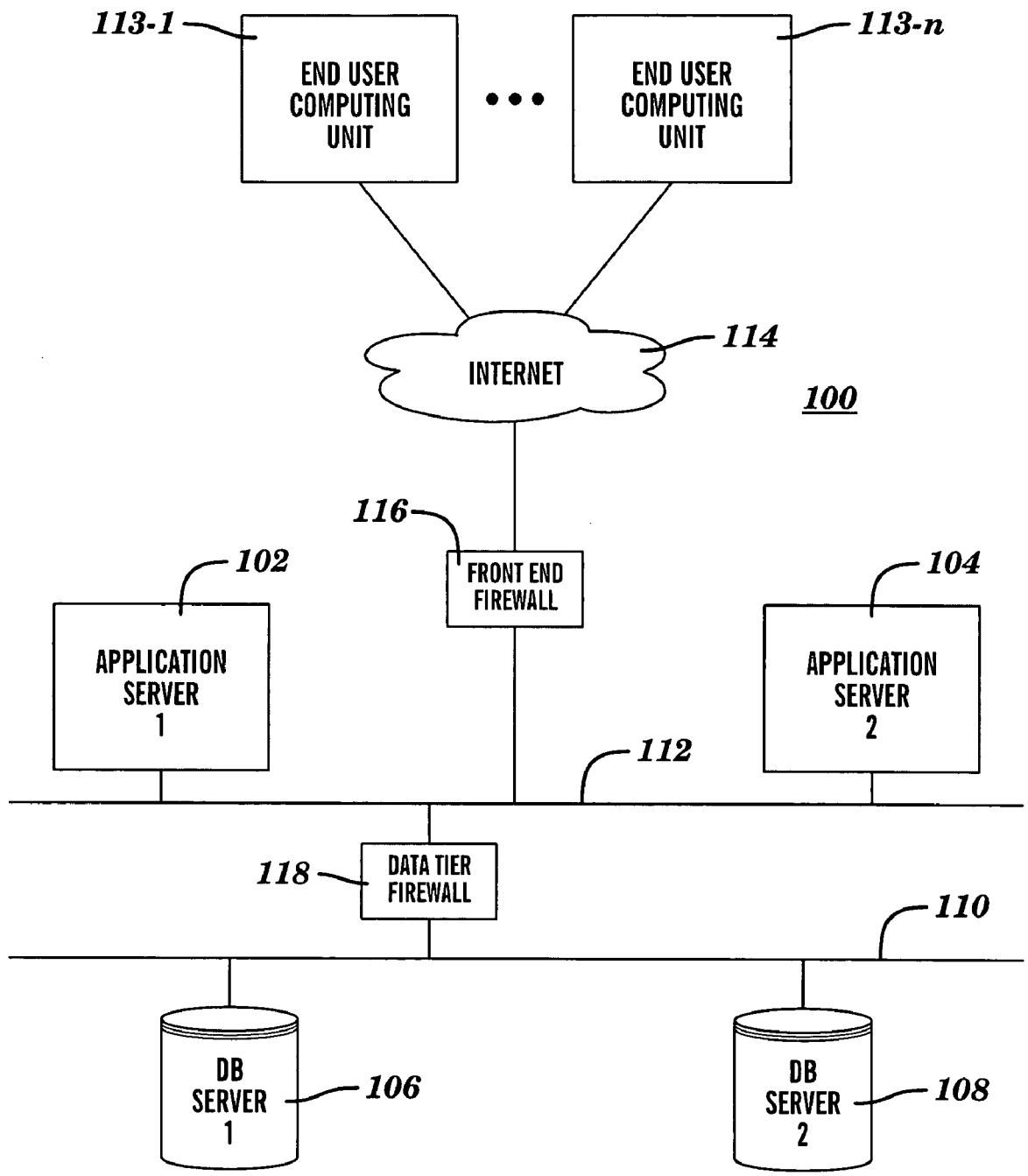
FIG. 1 is a block diagram of a system including an application associated with a user activity level to be predicted, in accordance with embodiments of the present invention.

FIG. 1 is a block diagram of a system including an application associated with a user activity level to be predicted, in accordance with embodiments of the present invention. System 100 is a multi-tier system that includes a plurality of application servers 102, 104 (i.e., business tier) and a plurality of database servers 106, 108 (i.e., data tier). Application servers 102, 104 are connected via a communication link 112 and database servers 106, 108 are connected via a communication link 110. Communication links 110, 112 are, for example, local area network (LAN) segments. System 100 also includes multiple client or end user computing units 113-1 . . . 113-*n* (e.g., personal computers) which communicate with the business and data tiers via the Internet 114 or other network. Application servers 102, 104 are separated from the Internet 114 by a front end firewall 116. Application servers 102, 104 and database servers 106, 108 are separated by a data tier firewall 118. Application servers 102, 104 can be dedicated mini or mainframe computers. Database servers 106, 108 can be computers capable of executing a database management system that manages magnetic or optical storage media. One or more servers of application servers 102, 104 include an application utilized by a plurality of users whose activity level associated with the application is predicted by the technique described herein. A user of the application sends a request to an application server 102 or 104. The application server receiving the request may query a database server 106 or 108 in order to prepare a response to the request. The plurality of users utilizes the application via end user computing units 113-1 . . . 113-*n*.

The user activity level prediction technique is used to reallocate hardware resources such as application servers 102, 104 based on a comparison between the predicted user activity level and pre-defined resource provisioning thresholds. Other examples of hardware resources that can be reallocated based on the user activity level prediction technique described herein include database servers 106, 108 and web servers (not shown).

In one embodiment, the application utilized by the plurality of users is a web application included on each of application servers 102, 104, each of the servers also including a web server that is capable of communicating, via the Internet 114, with a web browser residing on an end user computing unit 113. As used herein, a web application is a software application delivered to users from a server (e.g., server 102) over a network such as the Internet 114 or an intranet. An end user utilizing end user computing unit 113 interacts with the web application provided by server 102 via an interface provided by the web browser. Hereinafter, the aforementioned application residing on application servers 102, 104 is referred to simply as "the application."

Figure 2:
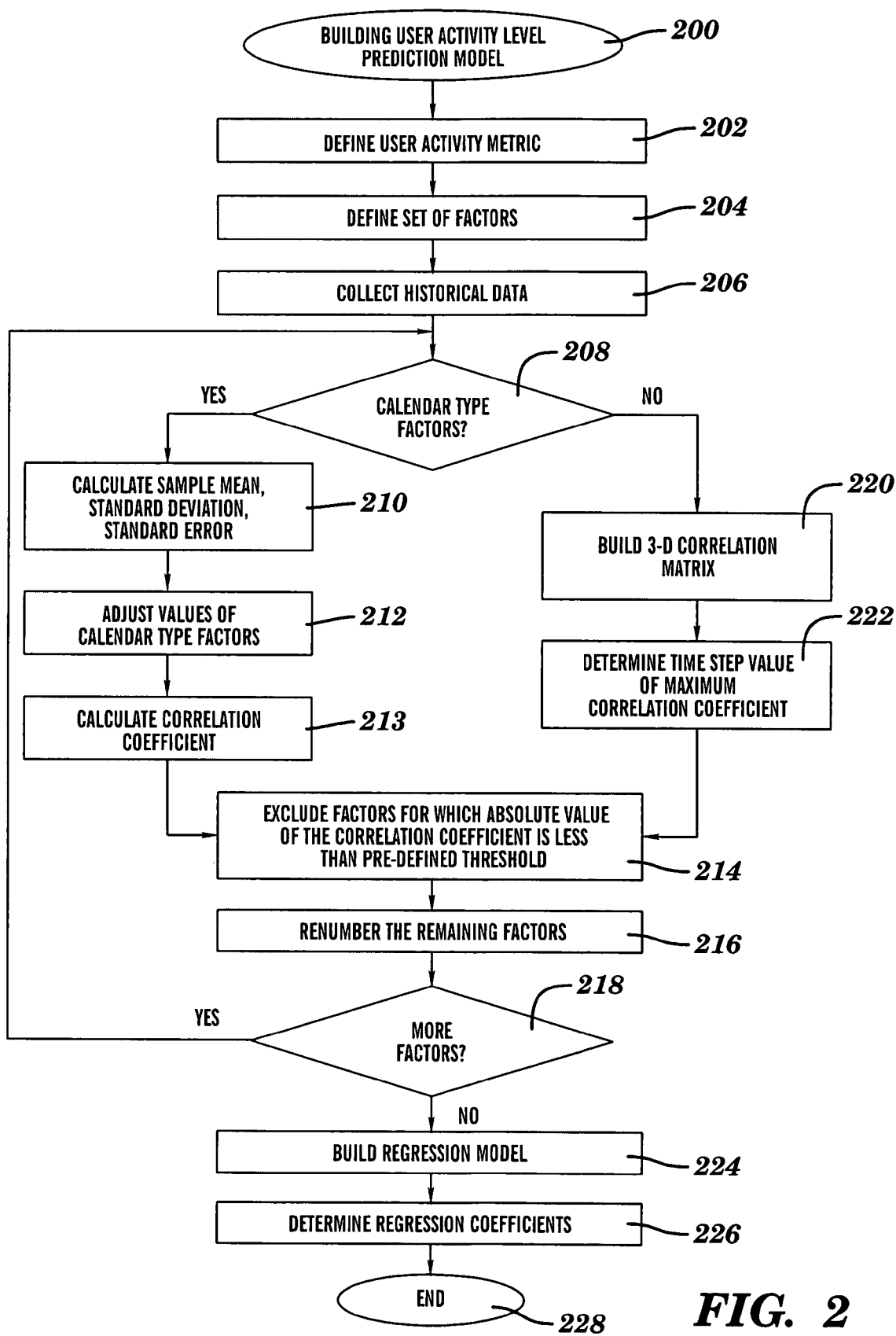
FIG. 2 is a flow chart of a method of generating a model to predict a user activity level associated with an application executing on the system of FIG. 1, in accordance with embodiments of the present invention.

FIG. 2 is a flow chart of a method of generating a model to predict a user activity level associated with the application executing on the system of FIG. 1, in accordance with embodiments of the present invention. Hereinafter, for simplicity, the aforementioned model is referred to as the prediction model. The prediction model generation process begins at step 200. In step 202, a user activity metric (UAM) is defined. A UAM is a variable to which a plurality of measurements is assigned. Each of the measurements assigned to a UAM is an activity level having a bearing upon a load on computing infrastructure (e.g., web servers, application servers and database servers) underlying the application. As used herein, an activity level (a.k.a. user activity level) is defined to be (1) a number of transactions performed by a plurality of users utilizing the application via end user computing units 113-1 . . . 113-$n$, wherein the transaction is performed during a time period of a pre-defined set of one or more time periods, or (2) a number of users of the plurality of users who actively utilize the application during a time period of the pre-defined set of one or more time periods. For an activity level of type (1), the transactions consume similar types and amounts of computing resources, while each of the users is capable of performing an arbitrary number of transactions. For an activity level of type (2), each of the users utilizing the application performs an activity that is similar in terms of the amount and type of computing resources required.

In the context of the present invention, a user is equivalent to an end user and is defined as a person who utilizes a fully developed computer application (e.g., a web application provided by application server 102 of FIG. 1) via an interface. As used herein, a transaction is defined as an action by one or more users together with one or more associated responses by the application representing a unit of business activity. A transaction is typically executed in real time in its entirety.

In step 204, a plurality of factors that are associated with the application's user activity level is defined and a sequence of indices is assigned to the factors in the set. A factor is a variable that has an effect upon the UAM according to expert knowledge. Hereinafter, unless otherwise stated, a reference to a factor includes the variable that affects the UAM, and any values assigned to the variable. Each of the defined factors is placed into one of the following three discrete groups, which are discussed below relative to step 208: calendar type factors, external factors and internal factors. The plurality of factors can be included in one of the aforementioned three groups or be divided among any combination of the three groups.

In step 206, historical data is collected. The historical data is used to provide values during a plurality of time periods for one or more of the factors defined in step 204, and measurements during a plurality of time periods for the UAM defined in step 202. The measurements are user activity levels associated with the application. A plurality of values provided by or based on the historical data are assigned to each non-calendar type factor, and are associated, in a one-to-one correspondence, with the plurality of time periods. Step 206 also assigns a plurality of values based on a cyclic time scale to each calendar type factor.

For each calendar type factor, a plurality of measurements provided by the historical data are assigned to the UAM in step 206, where the plurality of measurements are associated with the plurality of values assigned to the calendar type factor.

For each non-calendar type factor, a plurality of measurements is assigned to the UAM, and the plurality of measurements is included in a plurality of sets of at least two measurements, where each set corresponds to a specific time lag or time step between the measurements in the set and the associated values of a non-calendar type factor. The time step is described in more detail in the Non-Calendar Type Factors—Correlation Analysis section, which is presented below. In one embodiment, a first set of the plurality of sets includes the plurality of measurements that are associated, in a one-to-one correspondence, with the plurality of values assigned to the factor, where the other sets are subsets of the first set. Further, the at least two measurements of each set of the plurality of sets depends upon a factor defined in step 204.

Calendar Type Factors—Correlation Analysis

Inquiry step 208 determines if the factors defined in step 204 include one or more calendar type factors. If the factors include one or more calendar type factors, then for each of the calendar type factors, step 210 calculates the sample mean, standard deviation, and standard error of the associated plurality of measurements of the UAM. A value of the sample mean+N*standard error is also calculated, where N is a pre-defined multiplier (e.g., 3).

A calendar type factor is a variable to which a plurality of values of a cyclic time scale are assigned, wherein each value represents an amount of time elapsed from a specified event, and the plurality of values have a linear relationship to a time scale. For example, the numeric values 0, 1, 2, 3, 4 can be assigned to a calendar type factor representing the weekdays Monday through Friday, where 0 indicates Monday, 1 indicates Tuesday, etc. In this example, the specified event is the start of Monday, and each value represents a number of days elapsed from the start of Monday.

As used herein, a cyclic time scale is defined to be a time scale that cycles through a repeating pattern of values. The time scale is cyclic in the above example regarding weekdays because weekdays included in more than a single week are assigned values that cycle through the pattern of values 0, 1, 2, 3 and 4. For instance, weekdays starting with Monday of one week and ending with Friday of the following week are assigned the values 0, 1, 2, 3, 4, 0, 1, 2, 3, 4.

Other examples of a value of a calendar type factor include a representation of a time of day associated with the application's activity level, or a representation of a day of a plurality of days associated with the application's activity level, where the plurality of days is, for instance, a week, a month, a financial year that is different from a calendar year, or a sequence of days in a production cycle relative to a organization or organizational unit. If the value is a time of day, the value can be adjusted by the time zone in which a user of the application is located.

The historical data collected in step 206 provides a plurality of measurements that are assigned to the UAM, and that are associated, in a one-to-one correspondence, with the plurality of units of time (e.g., time of day, or day of a week) being represented by the plurality of values of a calendar type factor determined by step 208.

In step 212, the values of each calendar type factor are adjusted. Calendar type factor values that differ from the UAM sample mean by more than a pre-determined multiple of the standard error (e.g., three times the standard error), are adjusted to a base value (e.g., 0 value) on an adjusted factor scale. Other values of the calendar type factor are adjusted on a linear scale to reflect a distance to the base value, while retaining the linearity and scale of the unadjusted values. The adjustment of the other values is described below relative to Tables 1-4. The adjusted values, including the base value(s), are assigned to the calendar type factor to take the place of the unadjusted time scale-based values assigned in step 206.

The adjustment in step 212 is designed to more closely reflect linear dependency between the calendar type factor and the UAM, thereby resulting in the absolute value of the coefficient of correlation (a.k.a. correlation coefficient) between the adjusted values of the calendar type factor and the measurements of the UAM being greater than the absolute value of the correlation coefficient between the non-adjusted values of the calendar type factor and the measurements of the UAM. Without the adjustment, the correlation coefficient between the calendar type factor values and the measurements assigned to the UAM may be less than a pre-defined threshold value, and may be excluded from the factors being utilized to predict an activity level via a regression model (see, e.g., steps 214 and 224 discussed below).

An example of an adjustment to values of a calendar type factor representing weekdays is shown in Table 1. Column (1) of Table 1 includes values of the calendar type factor that represent the weekdays of column (2). Column (3) includes measurements assigned to the UAM, which are numbers of transactions broken down by days of the week. The transactions were performed by users of a business application over a one-year period. Column (4) includes the adjusted values that correspond to the values in column (1). Below the table values are the sample mean, standard deviation, and standard error calculated by step 210 for the column (3) measurements. Below the standard error is a value for the expression (sample mean+3*standard error).

TABLE 1

| (1) Numeric value of the factor | (2) Day of week | (3) Number of transactions Per day | (4) Adjusted value |
|---|---|---|---|
| 0 | Mon | 70258 | 0 |
| 1 | Tue | 59045 | 1 |

TABLE 1-continued

| 2 | Wed | 50987 | 2 |
|---|---|---|---|
| 3 | Thu | 52126 | 2 |
| 4 | Fri | 54598 | 1 |

| Mean | 57402.8 |
|---|---|
| Standard deviation | 6997.528118 |
| Standard error | 3129.389709 |
| Mean + 3*Standard error | 66790.97 |

Factor values in column (1) that correspond to UAM measurements that exceed the mean UAM measurement by more than three times the standard error are designated as having a 0 value on an adjusted value scale. As used herein, a UAM measurement is a measurement assigned to the UAM. In the example of Table 1, since the number of transactions for Monday, 70258, exceeds the mean+3*standard error value of 66790.97, a 0 value is placed in column (4) corresponding to Monday. Further, the 70258 measurement is a peak value. As used herein, a peak value is defined to be an activity level exceeding the mean+3*standard error value. Further, the numeric values of the factor are adjusted to reflect a distance to the designated 0 value. A stance to a designated 0 value is expressed in the units of the unadjusted factor values. If only one peak value is determined for a factor, then the distance to the 0 value is calculated by using the equation (1):

$$A = \min(|a-Z|; |a-S-Z|; |a+S-Z|) \quad (1)$$

wherein
  min(x, y, z) returns the minimum of the three operands,
  |X| returns the absolute value of X,
  A is an adjusted value of a calendar-type factor (e.g., a value in column (4) of Table 1),
  a is a non-adjusted value (e.g., a value in column (1) of Table 1),
  S is a size of a cyclic calendar-type scale used by the calendar type factor (e.g., 5 indicated by the five business days in the example shown by Table 1), and
  Z is a non-adjusted value associated with a peak value (e.g., 0 in column (1) of Table 1 is the non-adjusted value associated with the peak value of 70258).

Table 2 includes the example of Table 1 with extra columns (4), (5) and (6) showing the intermediate values that are used to determine the adjusted values in column (7). Using equation (1) above, a is the numeric value in column (1), S is 5 because there are five weekdays in the cycle of days used by the calendar type factor, Z is 0 because zero is the column (1) value corresponding to the peak value of 70258, and A is the adjusted value in column (7). Columns (4), (5) and (6) include the intermediate values used as operands in the minimum function of equation (1). For example, in the second row, A in column (7) is 1 because the minimum of 1 in column (4), 4 in column (5) and 6 in column (6) is 1.

TABLE 2

| (1) Numeric value of the factor (a) | (2) Day of week | (3) Number of transactions per day | (4) $|a - Z|$ | (5) $|a - S - Z|$ | (6) $|a + S - Z|$ | (7) Adjusted value (A) |
|---|---|---|---|---|---|---|
| 0 = Z | Mon | 70258 | 0 | 5 | 5 | 0 |
| 1 | Tue | 59045 | 1 | 4 | 6 | 1 |
| 2 | Wed | 50987 | 2 | 3 | 7 | 2 |

TABLE 2-continued

| (1)<br>Numeric value<br>of the factor<br>(a) | (2)<br>Day of<br>week | (3)<br>Number of<br>transactions<br>per day | (4)<br>$\|a - Z\|$ | (5)<br>$\|a - S - Z\|$ | (6)<br>$\|a + S - Z\|$ | (7)<br>Adjusted<br>value<br>(A) |
|---|---|---|---|---|---|---|
| 3 | Thu | 52126 | 3 | 2 | 8 | 2 |
| 4 | Fri | 54598 | 4 | 1 | 9 | 1 |

In another example (e.g., see Table 3), more than one peak value is associated with values of a calendar type factor. Hence, more than one zero is designated as an adjusted value and the other unadjusted numeric factor values are adjusted to reflect a distance to the closest zero on the adjusted scale. Since Table 3 includes two peak values, 70258 and 72222, two 0 values are designated in column (3) that correspond to the peak values.

TABLE 3

| (1)<br>Numeric value<br>of the factor | (2)<br>Number of<br>transactions<br>per day | (3)<br>Adjusted<br>value |
|---|---|---|
| 0 | 70258 | 0 |
| 1 | 59045 | 1 |
| 2 | 50987 | 1 |
| 3 | 72222 | 0 |
| 4 | 54598 | 1 |

Again, the adjustment in step 212 is designed to increase the absolute value of the correlation coefficient between the calendar type factor being adjusted and the UAM. This increase is shown in the example of Table 3, as the correlation coefficient between columns (1) and (2) (i.e., unadjusted values of the factor and the UAM measurements) is −0.30415, while the correlation coefficient between columns (3) and (2) (adjusted values of the factor and the UAM measurements) is −0.95027, and $|-0.95027|>|-0.30415|$.

For a calendar type factor whose unadjusted values include more than one value that is designated as a zero value on the adjusted value scale, equation (2) is used to calculate the adjusted values of the other factor values:

$$A = \min_{i=1,\ldots,m} (\min(|a - Z_i|; |a - S - Z_i|; |a + S - Z_i|)) \quad (2)$$

where $Z_i$ is the i-th factor value corresponding to a 0 value on the adjusted scale, where i=1, . . . m (e.g., $Z_1$=0 and $Z_2$=3 in the example shown in Table 3), m is the number of factor values corresponding to a 0 value on the adjusted scale (e.g., m=2 in the example shown in Table 3), and $$\min_{i=1,\ldots,m}$$

returns the minimum value of its operands for i=1, . . . , m

Table 4 includes the example of Table 3 with extra columns (3) and (4) showing the intermediate values that are used to determine the adjusted values in column (5). Using equation (2) above, a is the numeric value in column (1), S is 5 because there are five weekdays in the cycle of days used by the calendar type factor, $Z_1$ is 0 because zero is the column (1) value corresponding to the peak value of 70258, $Z_2$ is 3 because three is the column (1) value corresponding to the peak value of 72222, and A is the adjusted value in column (5). Columns (3) and (4) include the intermediate values used as operands in the outer minimum function of equation (2). For example, in the second row of data in Table 4, A in column (5) is 1 because the minimum of 1 in column (3) and 2 in column (4) is 1.

TABLE 4

| (1)<br>Numeric<br>value of<br>the factor<br>(a) | (2)<br>Number of<br>transactions<br>per day | (3)<br>min ($\|a - Z_1\|$;<br>$\|a - S - Z_1\|$;<br>$\|a + S - Z_1\|$) | (4)<br>min ($\|a - Z_2\|$;<br>$\|a - S - Z_2\|$;<br>$\|a + S - Z_2\|$) | (5)<br>Adjusted<br>value<br>(A) |
|---|---|---|---|---|
| 0 = $Z_1$ | 70258 | 0 | 2 | 0 |
| 1 | 59045 | 1 | 2 | 1 |
| 2 | 50987 | 2 | 1 | 1 |
| 3 = $Z_2$ | 72222 | 2 | 0 | 0 |
| 4 | 54598 | 1 | 1 | 1 |

For the regression model discussed below, any step 212 adjustment procedure is acceptable as long as there is a mapping (i.e., a functional relation) of non-adjusted factor values to adjusted values. In the examples of Tables 1-4, the described adjustment procedure provides the required mapping.

In step 213, a coefficient of correlation between each calendar type factor and the UAM is calculated. The coefficient of correlation calculation is based on the plurality of adjusted values (i.e., adjusted factor values) assigned to a factor and the plurality of measurements assigned to the UAM that are associated with the plurality of adjusted factor values. Since a coefficient of correlation computed in step 213 is the only coefficient of correlation computed using the plurality of values of a particular calendar type factor, its absolute value is also the maximum coefficient of correlation associated with that calendar type factor. Again, the plurality of values prior to their adjustment in step 212, and the plurality of measurements used in the correlation coefficient computation are obtained from historical data. Equation (3) is used to calculate the correlation coefficient:

$$r = \frac{\sum_{i=1,\ldots,n} (x_i - X)(y_i - Y)}{\sqrt{\sum_{i=1,\ldots,n} (x_i - X)^2 \sum_{i=1,\ldots,n} (y_i - Y)^2}} \quad (3)$$

where r is the correlation coefficient, $x_i$ is the i-th value of a factor, n is the number of values assigned to a factor and the number of measurements assigned to the UAM, $y_i$ is the i-th measurement that is assigned to the UAM, and that corresponds to $X_i$, and in the case of a calendar type factor, the i-th measurement is an adjusted measurement calculated by step 212, X is the $x_i$ sample mean:

$$X = \left(\sum_{i=1,\ldots,n} x_i\right) / n, \text{ and}$$

Y is the $y_i$ sample mean:

$$Y = \left(\sum_{i=1,\ldots,n} y_i\right) / n$$

In step 214 following step 213, each factor whose absolute value of the correlation coefficient calculated in step 213 is less than a pre-defined correlation coefficient threshold value (e.g., 0.3) is excluded from the set of factors defined in step 204. Although a single pre-defined threshold value (e.g., 0.3) is typically applied to all factors, multiple threshold values may be pre-defined, where different threshold values are associated with different factors. After step 214 excludes one or more factors from the set of factors defined in step 204, a subset of the original set of factors is defined that includes one or more factors that were defined by step 204 and not excluded by step 214. An exclusion of a factor in step 214 excludes the factor and its associated plurality of values from further analysis in the subsequent steps of FIG. 2. In step 216, the indices (see step 204) of the subset of factors determined by step 214 are renumbered to be sequential and to exclude any gaps in the indices caused by the exclusion of one or more factors by step 214. The renumbering of indices facilitates the use of vectors (e.g., arrays of factors) in the equation that describes the regression model discussed below relative to step 224.

Non-Calendar Type Factors—Correlation Analysis

If inquiry step 218 determines that one or more factors remain in the set of factors defined in step 204 that were not processed by steps 210, 212 and 213, then the method repeats inquiry 208. Inquiry 208 determines that the remaining one or more factors are non-calendar type factors that have a bearing upon the UAM. Non-calendar type factors are either external factors or internal factors. An external factor is a measurable variable having a bearing upon the UAM, whose values are determined by entities external to an organization that controls or uses the application whose activity level is being predicted by the present invention. Examples of external factors include: (1) national economic indicators, such as the Dow Jones Industrial Average (DJIA), national currency rate, consumer confidence index, and the number of new unemployment applications, and (2) prices of commodities.

An internal factor is a measurable variable having a bearing upon the UAM, and whose values are determined by activities or aspects present within the above-described organization. For example, internal factors include: (1) network activity (e.g., number of HTTP or Domain Name System (DNS) requests to all or a predefined subset of intranet and Internet sites per hour), (2) phone activity (e.g. number of incoming/outgoing phone calls per hour), (3) number of transactions performed by users of a specified business application per hour, (4) a user's job role, and (5) the locale of a user.

To build the regression model discussed below, non-calendar type factor values are actual measured values of a variable, estimated measurements, or values derived from the actual values. A derived value can be, for example, a rate of change (i.e., discrete analog of the derivative with respect to time).

Although not shown in FIG. 2, an alternate embodiment can include an adjustment procedure that provides a mapping of non-calendar type factor values to adjusted values to improve a correlation between a non-calendar type factor and the UAM. Rather than utilizing the single adjustment procedure for various calendar type factors in step 212, the variations between different non-calendar factors require that an adjustment procedure be customized to a particular non-calendar factor.

After inquiry 208 determines that the remaining one or more factors are non-calendar type factors, an array of historical data is collected to build a matrix consisting of $x_{ij}$ elements where $x_{ij}$ is a value of a plurality of values of an i-th factor of the non-calendar type factors defined by step 204, where the value is measured at the end of a discrete time period j of a plurality of time periods associated with the i-th factor. The time period is, for example, an hour, an 8-hour production shift, a 24-hour period, etc.

Step 220 builds a three dimensional matrix of $y_{ijk}$ elements that includes the matrix of $x_{ij}$ elements. A $y_{ijk}$ element is a measurement of the UAM measured at the end of a (j+k)-th discrete time period, where i is the index number of the factor associated with the UAM measurement, j is the index number of the discrete time period at the end of which the value of the factor was measured, and k is the number of discrete time periods between the factor measurement time and the UAM measurement time.

The three dimensional matrix also includes elements $r_{ik}$, where an $r_{ik}$ element is the correlation coefficient between the value of the i-th factor and the value of UAM measured k discrete time periods after the measurement of the i-th factor.

In step 222, for each factor of the one or more non-calendar type factors, a maximum coefficient of correlation is determined. The maximum coefficient of correlation for an i-th factor is the maximum value of the absolute values of the $r_{ik}$ values of the three dimensional matrix of step 220. Step 222 also determines a time step value $K_i$ associated with the maximum value of the absolute values of the correlation coefficients of the i-th non-calendar type factor using equation (4):

$$K_i = \arg\max |r_{ik}| \qquad (4)$$

where i is the index number of a factor, and k is the number of time periods between a measurement of a value of the i-th factor and an associated measurement assigned to the UAM.

Table 5 illustrates an example of data used to create the three dimensional matrix of step 220. In Table 5, the value of the DJIA is measured every hour during normal working hours for two consecutive business days. Each DJIA is measured at an hour that is indicated in the Time column (i.e., a Time of 10 indicates the time of 10:00 AM). The Time column values are in a chronological sequence. The number of transactions associated with a business application is also measured for at least a subset of the set of hours associated with the DJIA values.

TABLE 5

| Day | Time | DJIA | Delta DJIA | Number of transactions |
|---|---|---|---|---|
| Day 1 | 9 | 10173 | | |
| | 10 | 10160 | 13 | 1100 |
| | 11 | 10109 | 51 | 1250 |
| | 12 | 10050 | 59 | 1480 |
| | 1 | 10122 | 72 | 5780 |
| | 2 | 10120 | 2 | 6290 |
| | 3 | 10182 | 62 | 5201 |
| | 4 | 10222 | 40 | 2250 |
| Day 2 | 9 | 10225 | 3 | 5007 |
| | 10 | 10150 | 75 | 4520 |
| | 11 | 10140 | 10 | 2350 |
| | 12 | 10140 | 0 | 8475 |
| | 1 | 10112 | 28 | 3330 |
| | 2 | 10111 | 1 | 1922 |
| | 3 | 10109 | 2 | 3201 |

In this example, the application's user activity is dependent upon changes in DJIA, rather than the DJIA value itself.

Changes in DJIA are included in the column labeled Delta DJIA, which is the difference between the DJIA value associated with one time value (e.g., the current hour) and the DJIA value measured at the previous time value (e.g., the previous hour). For instance, the Delta DJIA of 13 in the second row of data is computed by 10173-10160 (i.e., the difference of the DJIA values associated with the times of 10:00 AM and 9:00 AM). The data under the Delta DJIA column represents a set of $x_{ij}$ elements described above for an i-th factor (i.e., Delta DJIA) and a set of j time periods under the Time column.

After Table 5 is compiled, the time step or time lag between the DJIA changes and the reaction of users of the business application is determined. To determine the time lag, a two-dimensional matrix is created by associating the number of transactions measured k hours after the Delta DJIA is measured with the Delta DJIA values. Table 6 shows one level (a.k.a. cross section) of the three dimensional matrix, with the number of transactions measured k=0, 1, 2, 3, and 4 hours after the Delta DJIA values were measured. Each measurement of the number of transactions in Table 6 is a $y_{ijk}$ element described above. Correlation coefficients are also computed and shown in Table 6 for each of the k values. Since the number of user activity level measurements that correspond to Delta DJIA values varies depending on the k column in Table 6, each of the correlation coefficients in Table 6 is computed with a different value of n in equation (3). For example, in the k=0 column, n=14 for the correlation coefficient computation in equation (3) because all 14 user activity level measurements correspond to one of the 14 Delta DJIA values, where n is the number of user activity level measurements; in the k=1 column, n=13 because only 13 of the user activity level measurements correspond to Delta DJIA values; in the k=2 column, n=12, etc. One level of the three dimensional matrix corresponds to a single i-th factor, where the case of i=0 is shown in Table 6. Although not shown, the complete three dimensional matrix includes multiple levels, each level including data from a table similar to Table 6, where each table corresponds to an i-th factor. Each level of the three dimensional matrix can include different numbers of data rows that correspond to time periods.

TABLE 6

| Delta DJIA | k = 0 | k = 1 | k = 2 | k = 3 | k = 4 |
|---|---|---|---|---|---|
| | | | | | 1100 |
| | | | | 1100 | 1250 |
| | | | 1100 | 1250 | 1480 |
| | | 1100 | 1250 | 1480 | 5780 |
| 13 | 1100 | 1250 | 1480 | 5780 | 6290 |
| 51 | 1250 | 1480 | 5780 | 6290 | 5201 |
| 59 | 1480 | 5780 | 6290 | 5201 | 2250 |
| 72 | 5780 | 6290 | 5201 | 2250 | 5007 |
| 2 | 6290 | 5201 | 2250 | 5007 | 4520 |
| 62 | 5201 | 2250 | 5007 | 4520 | 2350 |
| 40 | 2250 | 5007 | 4520 | 2350 | 8475 |
| 3 | 5007 | 4520 | 2350 | 8475 | 3330 |
| 75 | 4520 | 2350 | 8475 | 3330 | 1922 |
| 10 | 2350 | 8475 | 3330 | 1922 | 3201 |
| 0 | 8475 | 3330 | 1922 | 3201 | |
| 28 | 3330 | 1922 | 3201 | | |
| 1 | 1922 | 3201 | | | |
| 2 | 3201 | | | | |
| Correlation coefficient | −0.08584 | −0.08818 | 0.904019 | −0.25913 | −0.23288 |

After creating Table 6 for the i=0 factor, equation (4) determines in step 222 that $K_0=2$ because k=2 is associated with 0.904019, the maximum value of the absolute values of the correlation coefficients on the correlation coefficient row in Table 6. $K_0=2$ indicates that the user of the business application react to the changes in DJIA with a 2 hour time lag. Therefore, in this case, building the regression model discussed below uses the Delta DJIA measured two hours before the time for which the UAM is measured.

Following step 222, step 214 is performed again as described above, except that the maximum correlation coefficient determined in step 222 for each non-calendar type factor is compared to the pre-defined threshold value (e.g., 0.3). If any maximum correlation coefficient, which is determined for an i-th non-calendar type factor in step 220, is less than a pre-defined correlation coefficient threshold value (e.g., 0.3), then the i-th non-calendar type factor is excluded from the subset of factors defined by the performance of step 214 that follows step 213. In other words, an i-th non-calendar type factor is excluded if all of its associated $r_{ik}$ values are less than the pre-defined threshold value (e.g., 0.3). This exclusion of non-calendar type factors forms a second subset that includes calendar type factors not excluded by step 214 that follows step 213, and non-calendar type factors not excluded by step 214 that follows step 222. The second subset includes one factor or multiple factors. In a second occurrence of step 216 that follows steps 222 and 214, the indices (see step 204) of the second subset of factors determined by step 214 are renumbered to be sequential.

Although not shown in FIG. 2, one embodiment includes a loop back to step 204 after step 214, if the exclusion of factors in step 214 leaves less than a pre-defined number of factors (e.g., 2 factors) in the resulting subset of factors.

Following processing the one or more non-calendar type factors in steps 214 and 216, inquiry 218 determines that no additional factors remain which have not been processed by steps 210, 212 and 213 or by steps 220 and 222. After the exclusion(s) of step 214, the subset of factors remaining can include only one or more calendar type factors, only one or more non-calendar type factors or a combination of one or more calendar type factors and one or more non-calendar type factors.

The present invention contemplates other sequences of the FIG. 2 steps described above. For example, non-calendar type factors can be analyzed before the calendar type factors. As another example, the correlation analyses of both calendar type factors and non-calendar type factors can be completed before step 214, and in this case, the exclusion in step 214 can operate on any sequence including both calendar type factors and non-calendar type factors.

Regression Analysis

In step 224, a regression model is generated. The regression model is capable of predicting an activity level during a specified time period. The regression model is based on the one or more measurements assigned to the UAM in step 206 (see FIG. 2) and the one or more values or adjusted values assigned in steps 206 and 212 (see FIG. 2) to each of the factors in the subset of factors determined by the final occurrence of step 214 (see FIG. 2). In the case of the DJIA example of Table 6, since k=2 maximizes the correlation coefficient, the regression model uses the Delta DJIA measured two hours before the time at which the associated user activity level is measured. One example of the regression model is a multiple linear regression model that uses historical data input into equation (5):

$$U = b_0 + \sum_{i=1,\ldots,n} b_i x_i \quad (5)$$

where
U is the user activity level being predicted,
$x_i$ is the i-th factor,
$b_0$ is the 0-th regression coefficient, and
$b_i$ is the i-th regression coefficient.

In step 226, values of the regression coefficients in equation (5) are determined by methods known in the art. The method of FIG. 2 ends at step 228.

The present invention is not limited to using a multiple linear regression model to implement step 224. Other models, such as a polynomial regression model, can be utilized to overcome inadequacies of the multiple regression model.

It should be noted that the correlation analysis of the prediction model building technique presented above can be performed with greater precision if three or more values are assigned to each factor, and three or more measurements are assigned to the UAM, where the three or more values and three or more measurements are associated with three or more time periods.

Predicting a User Activity Level

Figure 3:
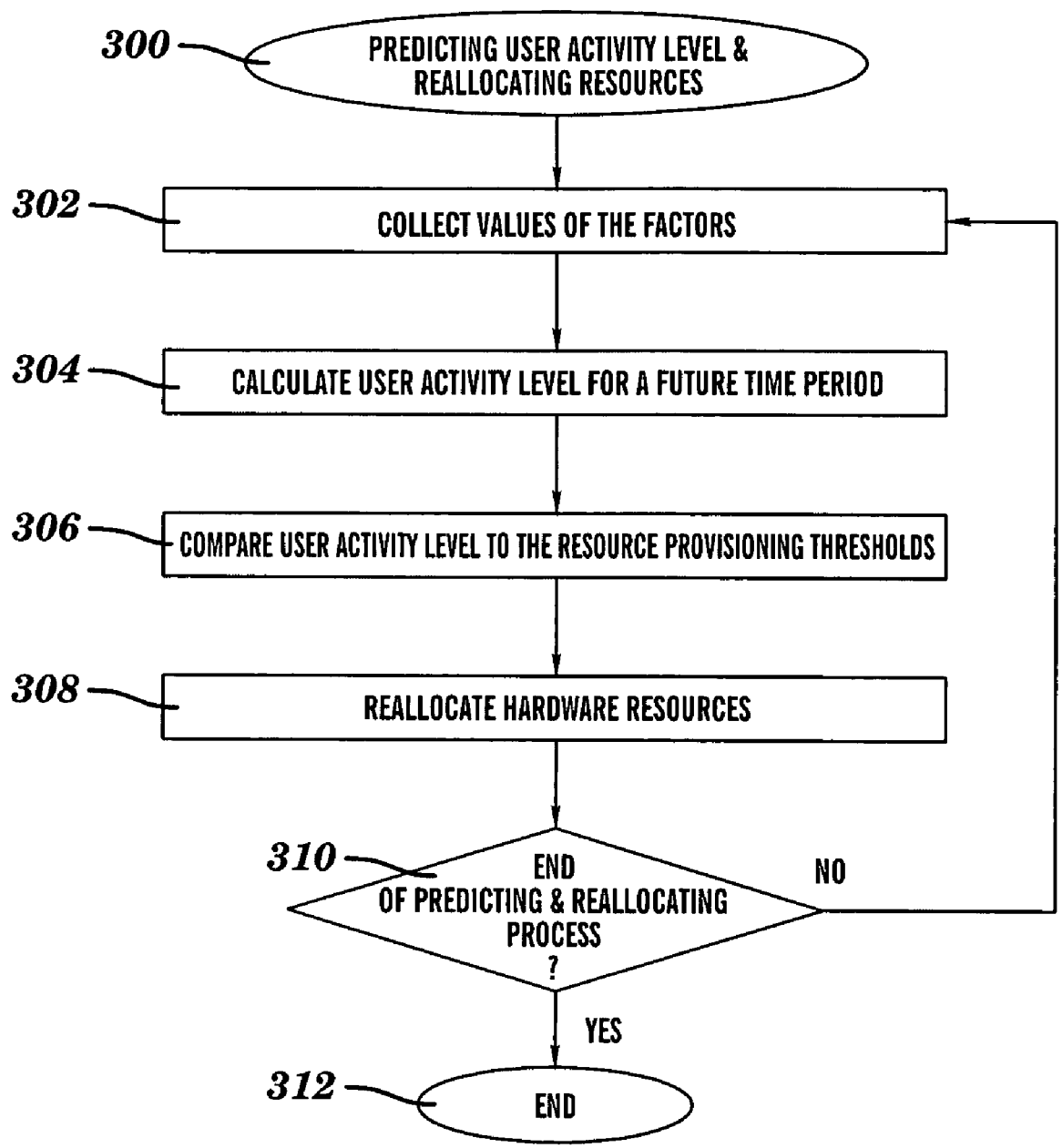
FIG. 3 is a flow chart of a method of utilizing the model of FIG. 2 to predict a user activity level associated with an application, in accordance with embodiments of the present invention.

FIG. 3 is a flow chart of a method of utilizing the model of FIG. 2 to predict a user activity level associated with an application and reallocate resources based on the prediction, in accordance with embodiments of the present invention. Hereinafter, the process of FIG. 3 is referred to as the predicting and reallocating process. A real time operation of a system that predicts a user activity level using the model generated by the process of FIG. 2 begins at step 300.

In step 302, real-time values of the non-calendar type factors included in the regression model generated in step 224 (see FIG. 2) are collected dynamically and periodically. The real-time values are supplied to a computing system (see FIG. 4) that predicts an activity level. The real-time values include one or more sets of one or more real-time values, and the one or more sets are associated, in one-to-one correspondence, with the one or more non-calendar type factors in the subset created by the final occurrence of step 214 (see FIG. 2). Each real-time value is used in the regression model of step 224 (see FIG. 2) (e.g., used as an $x_i$ value in equation (5)). In one embodiment, values collected in step 302 are assigned to non-calendar type factors of the regression model, and are measured $K_i$ units of time before the time associated with the activity level being predicted, where $K_i$ is computed by equation (4). Returning to the example of Table 6 where equation (4) computed $K_i=2$ hours, a value assigned in step 302 to the Delta DJIA factor is a value measured 2 hours before the time associated with the number of transactions being predicted by the regression model. In the Delta DJIA example, new DJIA measurements are collected every hour during business hours, and the process of FIG. 3 is repeated with the new DJIA measurements every hour, as long as other factor values are also being measured hourly.

In step 304, an activity level for a specified time period is predicted by calculating the activity level provided by the regression model generated in step 224 (see FIG. 2), which utilizes the regression coefficients determined in step 226 (see FIG. 2). For example, the computing system (see FIG. 4) that obtains the real-time values in step 302 performs the calculation in step 304. The activity level predicted in step 304 is a number of transactions to be performed by the plurality of users utilizing the application during a future time period, or a number of users that will utilize the application during a future time period.

In step 306, the predicted activity level of step 304 is compared to a plurality of pre-defined resource provisioning threshold values. In step 308, one or more hardware resources, such as servers (e.g., web servers, application servers and/or database servers), routers, load balancers, etc., are reallocated according to the comparisons of step 306.

In one embodiment, a pair of resource provisioning thresholds includes two UAM-related values and corresponding time periods, which are specified for different hardware elements (e.g., hardware server). An example of this embodiment is shown in Table 7.

The $UAM_1$ column of Table 7 indicates a "low water" provisioning threshold (LWPT). If the activity level predicted in step 304 is less than the LWPT for a period of time exceeding the value of $Time_1$ (e.g., a number of hours), then the hardware resource specified in the first column of Table 7 that corresponds to the LWPT is re-allocated (e.g., re-deployed) so that the hardware resource no longer services the application associated with the predicted activity level. For example, if the activity level predicted in step 304 is 4000 transactions per hour for a time period of 2 hours, then a web server is re-deployed away from servicing the application because 4000 is less than the LWPT for web servers (i.e., 5000 transactions per hour), and the two hour time period is greater than the Time$_1$ value (i.e., 1 hour) corresponding to web servers. In this example, there is no re-deployment of an application server or a database server, since the 4000 transactions per hour is greater than the LWPT (i.e., 500 transactions per hour) for application servers and database servers.

The UAM$_2$ column of Table 7 indicates a "high water" provisioning threshold (HWPT). If the activity level predicted in step 304 is more than the HWPT for a period of time exceeding the value of Time$_2$ (e.g., a number of hours), then an additional hardware resource is allocated or re-allocated to service the application associated with the predicted activity level. The additional hardware resource is of the same type as the hardware resource specified in the first column of Table 7 that corresponds to the HWPT. For example, if the activity level predicted in step 304 is 60,000 transactions per hour for a time period of 5 hours, then a web server is re-allocated to service the application because 60,000 is greater than the HWPT for web servers (i.e., 50,000 transactions per hour), and the 4 hour time period is greater than the Time$_2$ value (i.e., 3 hours) corresponding to web servers. In this example, there is also a re-allocation of an additional application server and an additional database server to service the application, since the 60,000 transactions per hour and the 5 hour period are respectively greater than the HWPT (i.e., 5000 transactions per hour) and the Time$_2$ value (i.e., 4 hours) for application servers and database servers.

TABLE 7

| Hardware Resource | UAM$_1$ (transactions per hour) | UAM$_2$ (transactions per hour) | Time$_1$ (hours) | Time$_2$ (hours) |
| --- | --- | --- | --- | --- |
| Web Server | 5000 | 50000 | 1 | 3 |
| Application Server | 500 | 5000 | 2 | 4 |
| DB Server | 500 | 5000 | 2 | 4 |

If inquiry step 310 determines that a status of the application, system 100 (see FIG. 1), or the computing unit that includes logic for predicting the user activity level (see FIG. 4) requires an end to the predicting and reallocating process, then the FIG. 3 process ends at step 312; otherwise, the predicting and reallocating process repeats starting at step 302.

Figure 4:
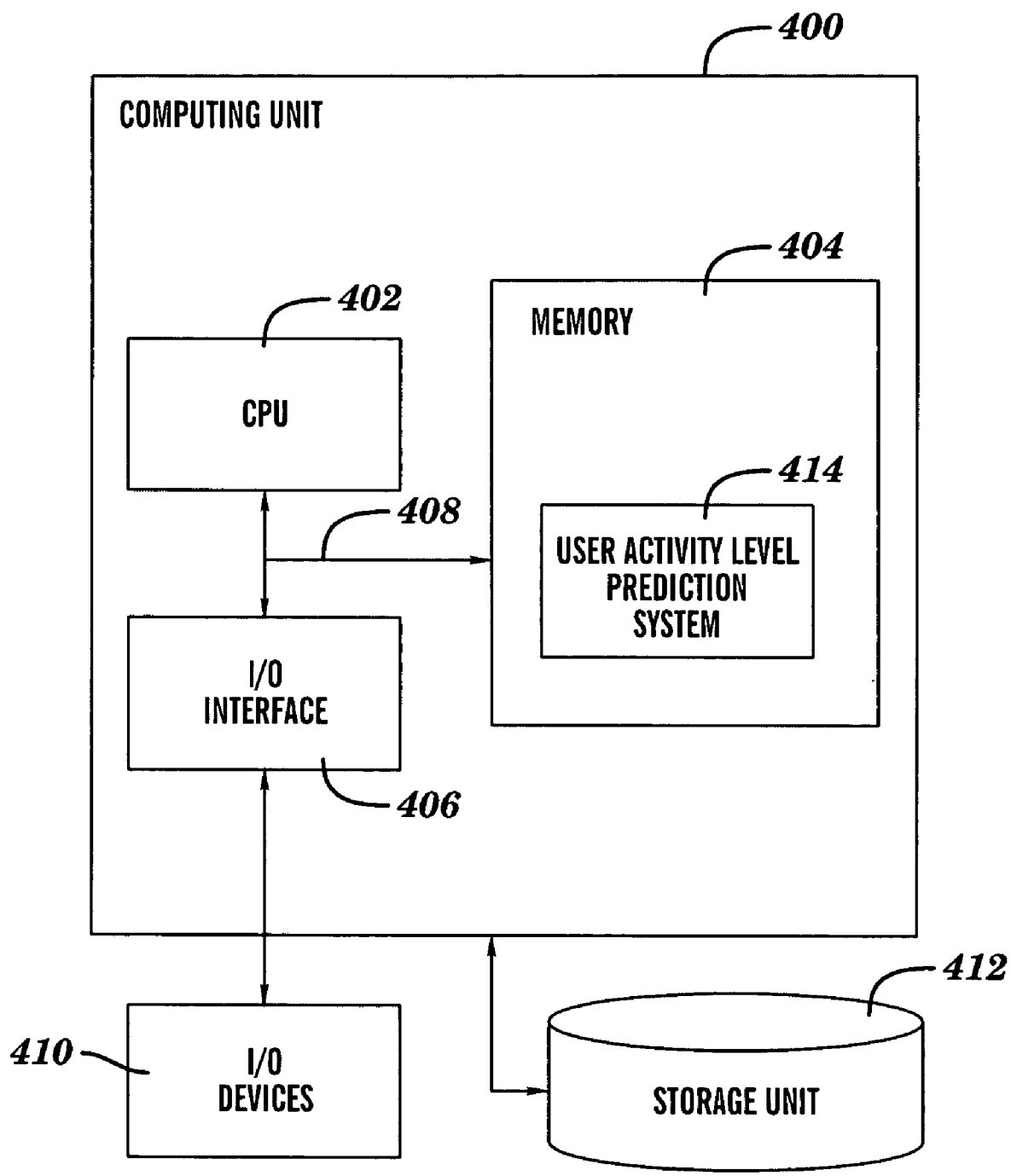
FIG. 4 is a block diagram of a computing unit for implementing the methods of FIGS. 2 and 3, in accordance with embodiments of the present invention.

FIG. 4 is a block diagram of a computing unit 400 for implementing the methods of FIGS. 2 and 3, in accordance with embodiments of the present invention. Computing unit 400 generally comprises a central processing unit (CPU) 402, a memory 404, an input/output (I/O) interface 406, a bus 408, I/O devices 410 and a storage unit 412. CPU 402 performs computation and control functions of computing unit 400. CPU 402 may comprise a single processing unit, or be distributed across one or more processing units in one or more locations (e.g., on a client and server). Memory 404 may comprise any known type of data storage and/or transmission media, including magnetic media, optical media, random access memory (RAM), read-only memory (ROM), a data cache, a data object, etc. Storage unit 412 is, for example, a magnetic disk drive or an optical disk drive. Moreover, similar to CPU 402, memory 404 may reside at a single physical location, comprising one or more types of data storage, or be distributed across a plurality of physical systems in various forms. Further, memory 404 can include data distributed across, for example, a LAN, WAN or storage area network (SAN) (not shown).

I/O interface 406 comprises any system for exchanging information to or from an external source. I/O devices 410 comprise any known type of external device, including a display monitor, keyboard, mouse, printer, speakers, handheld device, printer, facsimile, etc. Bus 408 provides a communication link between each of the components in computing unit 400, and may comprise any type of transmission link, including electrical, optical, wireless, etc.

I/O interface 406 also allows computing unit 400 to store and retrieve information (e.g., program instructions or data) from an auxiliary storage device, such as a non-volatile storage device (e.g., a CD-ROM drive which receives a CD-ROM disk) (not shown). Computing unit 400 can store and retrieve information from other auxiliary storage devices (not shown), which can include a direct access storage device (DASD) (e.g., hard disk or floppy diskette), a magneto-optical disk drive, a tape drive, or a wireless communication device.

Memory 404 includes computer program code comprising a user activity level prediction system 414 that predicts user activity levels associated with an application executing on application servers 102, 104 (see FIG. 1). User activity level prediction system 414 implements logic of the processes of FIGS. 2 and 3. Further, memory 404 may include other systems not shown in FIG. 4, such as an operating system (e.g., Linux) that runs on CPU 402 and provides control of various components within and/or connected to computing unit 400.

Computing unit 400 is linked to a switch (not shown) that is also linked to the plurality of servers 102, 104, 106, and 108 of FIG. 1.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 414 for use by or in connection with a computing unit 400 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 404, ROM, a rigid magnetic disk and an optical disk. Current examples of optical disks include compact disk-read-only memory (CD-ROM), compact disk-read/write (CD-R/W) and DVD.

A computing system 400 suitable for storing and/or executing program code 414 includes at least one processor 402 coupled directly or indirectly to memory elements 404 through a system bus 408. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 400, wherein the code in combination with computer system 400 is capable of predicting a user activity level associated with an application. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of predicting a user activity level associated with an application executing on a computing system in a multi-user computing environment, comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

defining a plurality of factors associated with said plurality of activity levels, said plurality of factors including a calendar type factor, said calendar type factor capable of being assigned a plurality of values of a cyclic time scale, wherein each value of said plurality of values represents an amount of time elapsed from a specified event;

assigning said plurality of activity levels to said UAM;

assigning said plurality of values to said calendar type factor of said plurality of factors, said plurality of values associated with said plurality of activity levels in a one-to-one correspondence, and with said plurality of time periods in a one-to-one correspondence;

adjusting, subsequent to said assigning said plurality of values to said calendar type factor, said plurality of values to a plurality of adjusted values, said plurality of adjusted values including a pre-defined base value and one or more other adjusted values, wherein an adjusted value of said one or more other adjusted values represents a distance to said pre-defined base value, and wherein said adjusting includes facilitating a representation of a linear dependency between said plurality of adjusted values and said plurality of activity levels;

calculating a plurality of coefficients of correlation, said calculating said plurality of coefficients of correlation including calculating a first coefficient of correlation between said plurality of adjusted values and said plurality of activity levels;

determining that an absolute value of said first coefficient of correlation is less than a pre-defined threshold value;

excluding, in response to said determining, said calendar type factor from said plurality of factors, said excluding including forming a subset of said plurality of factors, said subset including one or more factors, wherein an absolute value of a second coefficient of correlation between a set of values assigned to any factor of said one or more factors and said plurality of activity levels is greater than or equal to said pre-defined threshold value; and generating a regression model to predict an activity level, said regression model based on said plurality of activity levels and said subset.

2. The method of claim 1, further comprising:

collecting, in real time, one or more sets of one or more values, said one or more sets of one or more values associated with said one or more factors included in said subset in a one-to-one correspondence; and calculating said activity level via said regression model utilizing said one or more sets of one or more values, wherein said activity level is a number of transactions to be performed by said plurality of users utilizing said application during a future time period or a number of said users to be utilizing said application during said future time period.

3. The method of claim 2, further comprising:

comparing said activity level to a plurality of resource provisioning threshold values;

provisioning, responsive to said comparing, one or more resources of said computing system, said provisioning comprising one of:

reallocating a first resource of said one or more resources to said application, wherein said activity level exceeds a first threshold value of said plurality of resource provisioning threshold values, and reallocating a second resource of said one or more resources from said application to another portion of said computing system, wherein said activity level is less than a second threshold value of said plurality of resource provisioning threshold values, said second threshold value being different from said first threshold value.

4. A method of predicting a user activity level associated with an application executing on a computing system in a multi-user computing environment, comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

defining a plurality of factors associated with said UAM;

assigning said plurality of activity levels to said UAM;

assigning a plurality of values to a factor of said plurality of factors, said plurality of values associated with said plurality of activity levels in a one-to-one correspondence, and with said plurality of time periods in a one-to-one correspondence;

calculating at least one coefficient of correlation between at least two values of said plurality of values and at least two activity levels of said plurality of activity levels;

determining a maximum coefficient of correlation of said at least one coefficient of correlation that is less than a pre-defined threshold value;

excluding, in response to said determining, said factor from said plurality of factors to facilitate forming a subset of said plurality of factors, said subset including one or more factors, wherein an absolute value of a coefficient of correlation between any factor of said one or more factors and said UAM is greater than or equal to said pre-defined threshold value;

generating a regression model to predict an activity level, said regression model based on said plurality of activity levels and said subset, wherein said defining said plurality of factors comprises defining said factor as a calendar type factor for which each value of said plurality of values represents an amount of time elapsed from a specified event, wherein said at least one coefficient of correlation comprises a single coefficient of correlation, and wherein said maximum coefficient of correlation is an absolute value of said single coefficient of correlation;

determining a sample mean, a standard deviation, and a standard error associated with said plurality of activity levels, said plurality of activity levels being historical data;

modifying a value of said plurality of values to a pre-defined base value, wherein said value is associated with an activity level of said plurality of activity level exceeding said sample mean by more than said standard error multiplied by a pre-defined number; and adjusting other values of said plurality of values to a set of two or more adjusted values, wherein an adjusted value of said two or more adjusted values represents a distance to said base value, wherein said calculating utilizes said base value and said set of two or more adjusted values to calculate said single coefficient of correlation, wherein a first absolute value of said single coefficient of correlation is greater than a second absolute value of another coefficient of correlation between said plurality of values and said plurality of activity levels.

5. The method of claim 1, wherein a value of said plurality of values assigned to said calendar type factor comprises:
a time of a day associated with said activity level and adjusted by a time zone in which a user of said plurality of users is located.

6. A method of predicting a user activity level associated with an application executing on a computing system in a multi-user computing environment, said method comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said plurality of users utilizing said application during said time period;

defining a plurality of factors associated with said plurality of activity levels, said plurality of factors including a first subset of said plurality of factors, said first subset including at least one factor, wherein each factor of said first subset is a measurable variable on which said UAM depends, wherein said measurable variable is not a calendar type factor capable of being assigned amounts of time elapsed from a specified event;

assigning said plurality of activity levels to said UAM, said assigning said plurality of activity levels including assigning a plurality of sets of at least two activity levels, wherein each set of said at least two activity levels depends upon a factor of said plurality of factors;

assigning a plurality of values to each factor of said plurality of factors, said plurality of factors associated with said plurality of activity levels in a one-to-one correspondence, and with said plurality of time periods in a one-to-one correspondence;

generating a first matrix of $X_{ij}$ elements, wherein $x_{ij}$ is a value of an i-th factor of said first subset of said plurality of factors, said value of said i-th factor measured at an end of a j-th time period of said plurality of time periods;

generating a second matrix including said first matrix, wherein said second matrix is a three dimensional matrix including $y_{ijk}$ elements, wherein $y_{ijk}$ is an (i,j,k)-th activity level assigned to said UAM, and included in a k-th set of said plurality of sets of at least two activity levels, said (i,j,k)-th activity level associated with said $x_{ij}$ and measured at an end of a (j+k)-th time period of said plurality of time periods;

calculating a plurality of coefficients of correlation, wherein each coefficient of correlation of said plurality of coefficients of correlation is $r_{ik}$ and wherein said $r_{ik}$ is an (i,k)-th coefficient of correlation between said i-th factor of said first subset of said plurality of factors and said k-th set of said plurality of sets of at least two activity levels;

determining that each absolute value of $r_{jk}$ coefficients of correlation associated with said i-th factor is less than a pre-defined threshold value;

excluding, in response to said determining, said i-th factor from said plurality of factors, said excluding including forming a subset of said plurality of factors, said subset of said plurality of factors including one or more factors, wherein an absolute value of a coefficient of correlation between a set of values assigned to any factor of said one or more factors and said plurality of activity levels is greater than or equal to said pre-defined threshold value; and generating a regression model to predict an activity level, said regression model based on said plurality of activity levels and said subset of said plurality of factors.

7. A method of predicting a user activity level associated with an application executing on a computing system in a multi-user computing environment, comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

defining a plurality of factors associated with said UAM;

assigning a plurality of activity levels to said UAM;

assigning a plurality of values to a factor of said plurality of factors, said plurality of values associated with said plurality of activity levels in a one-to-one correspondence, and with said plurality of time periods in a one-to-one correspondence;

calculating at least one coefficient of correlation between at least two values of said plurality of values and at least two activity levels of said plurality of activity levels; determining a maximum coefficient of correlation of said at least one coefficient of correlation that is less than a pre-defined threshold value;

excluding, in response to said determining, said factor from said plurality of factors to facilitate forming a subset of said plurality of factors, said subset including one or more factors, wherein an absolute value of a coefficient of correlation between any factor of said one or more factors and said UAM is greater than or equal to said pre-defined threshold value; and generating a regression model to predict an activity level, said regression model based on said plurality of activity levels and said subset, wherein said defining said plurality of factors comprises:
defining a first subset of said plurality of factors, said first subset including at least one factor, wherein said factor is included in said first subset, wherein each factor of said first subset is a measurable variable on which said UAM depends, wherein said measurable variable is not a calendar type factor for which each value of said plurality of values represents an amount of time elapsed from a specified event, and wherein said method further comprises:

assigning said plurality of activity levels to said UAM, said plurality of activity levels included in a plurality of sets of at least two activity levels, wherein each set of said at least two activity levels depends upon a factor of said plurality of factors, and is included in said plurality of activity levels, and wherein said plurality of activity levels is included in one set of said plurality of sets;

generating a first matrix of $x_{ij}$ elements, wherein $x_{ij}$ is a value of an i-th factor of said first subset measured at an end of a j-th time period of said plurality of time periods; and generating a second matrix including said first matrix, wherein said second matrix is a three dimensional matrix including $y_{ijk}$ elements, wherein $y_{ijk}$ is an (i,j,k)-th activity level assigned to said UAM, and included in a k-th set of said plurality of sets of at least two activity levels, said (i,j,k)-th activity level associated with said $x_{ij}$ and measured at an end of a (j+k)-th time period of said plurality of time periods, and wherein said second matrix includes elements $r_{ik}$, wherein $r_{ik}$ is an (i,k)-th coefficient of correlation between said i-th factor of said first subset and said k-th set, wherein said maximum coefficient of correlation is an absolute value of an element (r) included in a set of said elements $r_{ik}$, wherein said absolute value of said r is greater than or equal to an absolute value of any other element of said set of said elements $r_{ik}$, said r being associated with said factor and with a set of said plurality of sets of at least two activity levels, and wherein said maximum coefficient of correlation is associated with a time step K, wherein each activity level of said set of said plurality of sets is measured K units of time after an end of a period of time of said plurality of periods of time.

8. The method of claim 7, further comprising:
assigning one or more factor values to said one or more factors of said subset in a one-to-one correspondence, wherein each factor value of said one or more factor values is measured said K units of time before a start of a period of time during which said activity level is to occur; and calculating said activity level via said regression model, wherein said regression model is a multiple linear regression model utilizing said one or more factor values as input to predict said activity level during said period of time during which said activity level is to occur.

9. A system for predicting a user activity level associated with an application executing on a computing system in a multi-user computing environment, comprising:

means for defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

means for defining a plurality of factors associated with said plurality of activity levels, said plurality of factors including a calendar type factor, said calendar type factor capable of being assigned a plurality of values of a cyclic time scale, wherein each value of said plurality of values represents an amount of time elapsed from a specified event;

means for assigning said plurality of activity levels to said UAM;

means for assigning said plurality of values to said calendar type factor of said plurality of factors, said plurality of values associated with said plurality of activity levels in a one-to-one correspondence, and with said plurality of time periods in a one-to-one correspondence;

means for adjusting, subsequent to said assigning said plurality of values to said calendar type factor, said plurality of values to a plurality of adjusted values, said plurality of adjusted values including a pre-defined base value and one or more other adjusted values, wherein an adjusted value of said one or more other adjusted values represents a distance to said pre-defined base value, and wherein said adjusting includes facilitating a representation of a linear dependency between said plurality of adjusted values and said plurality of activity levels;

means for calculating a plurality of coefficients of correlation, said calculating said plurality of coefficients of correlation including calculating a first coefficient of correlation between said plurality of adjusted values and said plurality of activity levels;

means for determining that an absolute value of said first coefficient of correlation is less than a pre-defined threshold value;

means for excluding, in response to said determining, said calendar type factor from said plurality of factors, said excluding including forming a subset of said plurality of factors, said subset including one or more factors, wherein an absolute value of a second coefficient of correlation between a set of values assigned to any factor of said one or more factors and said plurality of activity levels is greater than or equal to said pre-defined threshold value; and means for generating a regression model to predict an activity level, said regression model based on said plurality of activity levels and said subset.

10. The system of claim 9, further comprising:
means for collecting, in real time, one or more sets of one or more values, said one or more sets of one or more values associated with said one or more factors included in said subset in a one-to-one correspondence; and
means for calculating said activity level via said regression model utilizing said one or more sets of one or more values, wherein said activity level is a number of transactions to be performed by said plurality of users utilizing said application during a future time period or a number of said users to be utilizing said application during said future time period.

11. The system of claim 10, further comprising:
means for comparing said activity level to a plurality of resource provisioning threshold values;
means for provisioning, responsive to said comparing, one or more resources of said computing system, said means for provisioning comprising one of:
means for reallocating a first resource of said one or more resources to said application, wherein said activity level exceeds a first threshold value of said plurality of resource provisioning threshold values, and
means for reallocating a second resource of said one or more resources from said application to another portion of said computing system, wherein said activity level is less than a second threshold value of said plurality of resource provisioning threshold values, said second threshold value being different from said first threshold value.

12. The system of claim 9, wherein a value of said plurality of values assigned to said calendar type factor comprises:
a time of a day associated with said activity level and adjusted by a time zone in which a user of said plurality of users is located.

13. A system of predicting a user activity level associated with an application executing on a computing system in a multi-user computing environment, said system comprising:
means for defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said plurality of users utilizing said application during said time period;
means for defining a plurality of factors associated with said plurality of activity levels, said plurality of factors including a first subset of said plurality of factors, said first subset including at least one factor, wherein each factor of said first subset is a measurable variable on which said UAM depends, wherein said measurable variable is not a calendar type factor capable of being assigned amounts of time elapsed from a specified event;
means for assigning said plurality of activity levels to said UAM, said means for assigning said plurality of activity levels including means for assigning a plurality of sets of at least two activity levels, wherein each set of said at least two activity levels depends upon a factor of said plurality of factors;
means for assigning a plurality of values to each factor of said plurality of factors, said plurality of factors associated with said plurality of activity levels in a one-to-one correspondence, and with said plurality of time periods in a one-to-one correspondence;
means for generating a first matrix of $x_{ij}$ elements, wherein $x_{ij}$ is a value of an i-th factor of said first subset of said plurality of factors, said value of said i-th factor measured at an end of a j-th time period of said plurality of time periods;
means for generating a second matrix including said first matrix, wherein said second matrix is a three dimensional matrix including $y_{ijk}$ elements, wherein $y_{ijk}$ is an (i,j,k)-th activity level assigned to said UAM, and included in a k-th set of said plurality of sets of at least two activity levels, said (i,j,k)-th activity level associated with said $x_{ij}$ and measured at an end of a (j+k)-th time period of said plurality of time periods;
means for calculating a plurality of coefficients of correlation, wherein each coefficient of correlation of said plurality of coefficients of correlation is $r_{ik}$ and wherein said $r_{ik}$ is an (i,k)-th coefficient of correlation between said i-th factor of said first subset of said plurality of factors and said k-th set of said plurality of sets of at least two activity levels;
means for determining that each absolute value of $r_{ik}$ coefficients of correlation associated with said i-th factor is less than a pre-defined threshold value;
means for excluding, in response to said determining, said i-th factor from said plurality of factors, said means for excluding including means for forming a subset of said plurality of factors, said subset of said plurality of factors including one or more factors, wherein an absolute value of a coefficient of correlation between a set of values assigned to any factor of said one or more factors and said plurality of activity levels is greater than or equal to said pre-defined threshold value; and
means for generating a regression model to predict an activity level, said regression model based on said plurality of activity levels and said subset of said plurality of factors.

14. A computer program product comprising a computer-usable storage medium including computer-usable program code for predicting a user activity level associated with an application executing on a computing system in a multi-user computing environment, said computer program product comprising:
computer-usable code for defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;
computer-usable code for defining a plurality of factors associated with said plurality of activity levels, said plurality of factors including a calendar type factor, said calendar type factor capable of being assigned a plurality of values of a cyclic time scale, wherein each value of said plurality of values represents an amount of time elapsed from a specified event;
computer-usable code for assigning said plurality of activity levels to said UAM;
computer-usable code for assigning said plurality of values to said calendar type factor of said plurality of factors, said plurality of values associated with said plurality of activity levels in a one-to-one correspondence, and with said plurality of time periods in a one-to-one correspondence;
computer-usable code for adjusting, subsequent to said assigning said plurality of values to said calendar type factor, said plurality of values to a plurality of adjusted values, said plurality of adjusted values including a pre-defined base value and one or more other adjusted values, wherein an adjusted value of said one or more other adjusted values represents a distance to said pre-defined base value, and wherein said adjusting includes facilitating a representation of a linear dependency between said plurality of adjusted values and said plurality of activity levels;

computer-usable code for calculating a plurality of coefficients of correlation, said calculating said plurality of coefficients of correlation including calculating a first coefficient of correlation between said plurality of adjusted values and said plurality of activity levels;

computer-usable code for determining that an absolute value of said first coefficient of correlation is less than a pre-defined threshold value;

computer-usable code for excluding, in response to said determining, said calendar type factor from said plurality of factors, said excluding including forming a subset of said plurality of factors, said subset including one or more factors, wherein an absolute value of a second coefficient of correlation between a set of values assigned to any factor of said one or more factors and said plurality of activity levels is greater than or equal to said pre-defined threshold value; and computer-usable code for generating a regression model to predict an activity level, said regression model based on said plurality of active levels and said subset.

15. The program product of claim 14, further comprising:
computer-usable code for collecting, in real time, one or more sets of one or more values, said one or more sets of one or more values associated with said one or more factors included in said subset in a one-to-one correspondence; and computer-usable code for calculating said activity level via said regression model utilizing said one or more sets of one or more values, wherein said activity level is a number of transactions to be performed by said plurality of users utilizing said application during a future time period or a number of said users to be utilizing said application during said future time period.

16. The program product of claim 15, further comprising:
computer-usable code for comparing said activity level to a plurality of resource provisioning threshold values;
computer-usable code for provisioning, responsive to said comparing, one or more resources of said computing system, said computer-usable code for provisioning comprising one of:
  computer-usable code for reallocating a first resource of said one or more resources to said application, wherein said activity level exceeds a first threshold value of said plurality of resource provisioning threshold values, and
  computer-usable code for reallocating a second resource of said one or more resources from said application to another portion of said computing system, wherein said activity level is less than a second threshold value of said plurality of resource provisioning threshold values, said second threshold value being different from said first threshold value.

17. The program product of claim 14, wherein a value of said plurality of values assigned to said calendar type factor comprises:
a time of a day associated with said activity level and adjusted by a time zone in which a user of said plurality of users is located.

18. A computer program product comprising a computer-usable storage medium including computer-usable program code for predicting a user activity level associated with an application executing on a computing system in a multi-user computing environment, said computer program product comprising:

computer-usable code for defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said plurality of users utilizing said application during said time period;

computer-usable code for defining a pulrality of factors associated with said plurality of activity levels, said plurality of factors including a first subset of said plurality of factors, said first subset including at least one factor, wherein each factor of said first subset is a measurable variable on which said UAM depends, wherein said measurable variable is not a calendar type factor capable of being assigned amounts of time elapsed from a specified event;

computer-usable code for assigning said plurality of activity levels to said UAM, said computer-usable code for assigning said plurality of activity levels including computer-usable code for assigning a plurality of sets of at least two activity levels, wherein each set of said at least two activity levels depends upon a factor of said plurality of factors;

computer-usable code for assigning a plurality of values to each factor of said plurality of factors, said plurality of factors associated with said plurality of activity levels in a one-to-one correspondence, and with said plurality of time periods in a one-to-one correspondence;

computer-usable code for generating a first matrix of $X_{ij}$ elements, wherein $X_{ij}$ is a value of an i-th factor of said first subset of said plurality of factors, said value of said i-th factor measured at an end of a j-th time period of said plurality of time periods;

computer-usable code for generating a second matrix including said first matrix, wherein said second matrix is a three dimensional matrix including $y_{ijk}$ elements, wherein $y_{ijk}$ is an (i,j,k)-th activity level assigned to said UAM, and included in a k-th set of said plurality of sets of at least two activity levels, said (i,j,k)-th activity level associated with said $x_{ij}$ and measured at an end of a (j+k)-th time period of said plurality of time periods;

computer-usable code for calculating a plurality of coefficients of correlation, wherein each coefficient of correlation of said plurality of coefficients of correlation is $r_{ik}$ and wherein said $r_{ik}$ is an (i,k)-th coefficient of correlation between said i-th factor of said first subset of said plurality of factors and said k-th set of said plurality of sets of at least two activity levels;

computer-usable code for determining that each absolute value of $r_{ik}$ coefficients of correlation associated with said i-th factor is less than a pre-defined threshold value;

computer-usable code for excluding, in response to said determining, said i-th factor from said plurality of factors, said computer-usable code for excluding including computer-usable code for forming a subset of said plurality of factors, said subset of said plurality of factors including one or more factors, wherein an absolute value of a coefficient of correlation between a set of values assigned to any factor of said one or more factors and said plurality of activity levels is greater than or equal to said pre-defined threshold value; and computer-usable code for generating a regression model to predict an activity level, said regression model based on said plurality of activity levels and said subset of said plurality of factors.

19. A method for deploying computing infrastructure, comprising integrating computer-readable code into a computing system, wherein the code in combination with the computing system is capable of performing a process of predicting a user activity level associated with an application executing on a computing system in a multi-user computing environment, said process comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

defining a plurality of factors associated with said plurality of activity levels, said plurality of factors including a calendar type factor, said calendar type factor capable of being assigned a plurality of values of a cyclic time scale, wherein each value of said plurality of values represents an amount of time elapsed from a specified event;

assigning said plurality of activity levels to said UAM;

assigning said plurality of values to said calendar type factor of said plurality of factors, said plurality of values associated with said plurality of activity levels in a one-to-one correspondence, and with said plurality of time periods in a one-to-one correspondence;

adjusting, subsequent to said assigning said plurality of values to said calendar type factor, said plurality of values to a plurality of adjusted values, said plurality of adjusted values including a pre-defined base value and one or more other adjusted values, wherein an adjusted value of said one or more other adjusted values represents a distance to said pre-defined base value, and wherein said adjusting includes facilitating a representation of a linear dependency between said plurality of adjusted values and said plurality of activity levels;

calculating a plurality of coefficients of correlation, said calculating said plurality of coefficients of correlation including calculating a first coefficient of correlation between said plurality of adjusted values and said plurality of activity levels;

determining that an absolute value of said first coefficient of correlation is less than a pre-defined threshold value;

excluding, in response to said determining, said calendar type factor from said plurality of factors, said excluding including forming a subset of said plurality of factors, said subset including one or more factors, wherein an absolute value of a second coefficient of correlation between a set of values assigned to any factor of said one or more factors and said plurality of activity levels is greater than or equal to said pre-defined threshold value; and generating a regression model to predict an activity level, said regression model based on said plurality of activity levels and said subset.

20. The method of claim 19, said process further comprising:

collecting, in real time, one or more sets of one or more values, said one or more sets of one or more values associated with said one or more factors included in said subset in a one-to-one correspondence; and calculating said activity level via said regression model utilizing said one or more sets of one or more values, wherein said activity level is a number of transactions to be performed by said plurality of users utilizing said application during a future time period or a number of said users to be utilizing said application during said future time period.

21. The method of claim 20, said process further comprising:

comparing said activity level to a plurality of resource provisioning threshold values;

provisioning, responsive to said comparing, one or more resources of said computing system, said provisioning comprising one of:

reallocating a first resource of said one or more resources to said application, wherein said activity level exceeds a first threshold value of said plurality of resource provisioning threshold values, and reallocating a second resource of said one or more resources from said application to another portion of said computing system, wherein said activity level is less than a second threshold value of said plurality of resource provisioning threshold values, said second threshold value being different from said first threshold value.

22. A method for deploying computing infrastructure, comprising integrating computer-readable code into a computing system, wherein the code in combination with the computing system is capable of performing a process of predicting a user activity level associated with an application executing on a computing system in a multi-user computing environment, said process comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

defining a plurality of factors associated with said UAM;

assigning a plurality of activity levels to said UAM;

assigning a plurality of values to a factor of said plurality of factors, said plurality of values associated with said plurality of activity levels in a one-to-one correspondence, and with said plurality of time periods in a one-to-one correspondence;

calculating at least one coefficient of correlation between at least two values of said plurality of values and at least two activity levels of said plurality of activity levels;

determining a maximum coefficient of correlation of said at least one coefficient of correlation that is less than a pre-defined threshold value;

excluding, in response to said determining, said factor from said plurality of factors to facilitate forming a subset of said plurality of factors, said subset including one or more factors, wherein an absolute value of a coefficient of correlation between any factor of said one or more factors and said UAM is greater than or equal to said pre-defined threshold value; and generating a regression model to predict an activity level, said regression model based on said plurality of activity levels and said subset, wherein said defining said plurality of factors comprises defining said factor as a calendar type factor for which each value of said plurality of values represents an amount of time elapsed from a specified event, wherein said at least one coefficient of correlation comprises a single coefficient of correlation, and wherein said maximum coefficient of correlation is an absolute value of said single coefficient of correlation;

determining a sample mean, a standard deviation, and a standard error associated with said plurality of activity levels, said plurality of activity levels being historical data;

modifying a value of said plurality of values to a pre-defined base value, wherein said value is associated with an activity level of said plurality of activity levels exceeding said sample mean by more than said standard error multiplied by a pre-defined number; and adjusting other values of said plurality of values to a set of two or more adjusted values, wherein an adjusted value of said two or more adjusted values represents a distance to said base value, wherein said calculating utilizes said base value and said set of two or more adjusted values to calculate said single coefficient of correlation, wherein a first absolute value of said single coefficient of correlation is greater than a second absolute value of another coefficient of correlation between said plurality of values and said plurality of activity levels.

23. The method of claim 19, wherein a value of said plurality of values assigned to said calendar type factor comprises:

a time of a day associated with said activity level and adjusted by a time zone in which a user of said plurality of users is located.

24. A method of predicting a user activity level associated with an application executing on a computing system in a multi-user computing environment, said method comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said plurality of users utilizing said application during said time period;

defining a plurality of factors associated with said plurality of activity levels, said plurality of factors including a first subset of said plurality of factors, said first subset including at least one factor, wherein each factor of said first subset is a measurable variable on which said UAM depends, wherein said measurable variable is not a calendar type factor capable of being assigned amounts of time elapsed from a specified event;

assigning said plurality of activity levels to said UAM, said assigning said plurality of activity levels including assigning a plurality of sets of at least two activity levels, wherein each set of said at least two activity levels depends upon a factor of said plurality of factors;

assigning a plurality of values to each factor of said plurality of factors, said plurality of factors associated with said plurality of activity levels in a one-to-one correspondence, and with said plurality of time periods in a one-to-one correspondence;

generating a first matrix of $x_{ij}$ elements, wherein $x_{ij}$ is a value of an i-th factor of said first subset of said plurality of factors, said value of said i-th factor measured at an end of a j-th time period of said plurality of time periods;

generating a second matrix including said first matrix, wherein said second matrix is a three dimensional matrix including $y_{ijk}$ elements, wherein $y_{ijk}$ is an (i,j,k)-th activity level assigned to said UAM, and included in a k-th set of said plurality of sets of at least two activity levels, said (i,j,k)-th activity level associated with said $x_{ij}$ and measured at an end of a (j+k)-th time period of said plurality of time periods;

calculating a plurality of coefficients of correlation, wherein each coefficient of correlation of said plurality of coefficients of correlation is $r_{ik}$ and wherein said $r_{ik}$ is an (i,k)-th coefficient of correlation between said i-th factor of said first subset of said plurality of factors and said k-th set of said plurality of sets of at least two activity levels;

determining that each absolute value of $r_{ik}$ coefficients of correlation associated with said i-th factor is less than a pre-defined threshold value;

excluding, in response to said determining, said i-th factor from said plurality of factors, said excluding including forming a subset of said plurality of factors, said subset of said plurality of factors including one or more factors, wherein an absolute value of a coefficient of correlation between a set of values assigned to any factor of said one or more factors and said plurality of activity levels is greater than or equal to said pre-defined threshold value; and generating a regression model to predict an activity level, said regression model based on said plurality of activity levels and said subset of said plurality of factors.

25. A method for deploying computing infrastructure, comprising integrating computer-readable code into a computing system, wherein the code in combination with the computing system is capable of performing a process of predicting a user activity level associated with an application executing on a computing system in a multi-user computing environment, said process comprising:

defining a user activity metric (UAM) as a variable, said UAM being assigned a plurality of activity levels, wherein each activity level of said plurality of activity levels is a measured number of transactions performed by a plurality of users utilizing said application during a time period of a plurality of time periods, or a measured number of said users utilizing said application during said time period;

defining a plurality of factors associated with said UAM;

assigning a plurality of activity levels to said UAM;

assigning a plurality of values to a factor of said plurality of factors, said plurality of values associated with said plurality of activity levels in a one-to-one correspondence, and with said plurality of time periods in a one-to-one correspondence;

calculating at least one coefficient of correlation between at least two values of said plurality of values and at least two activity levels of said plurality of activity levels;

determining a maximum coefficient of correlation of said at least one coefficient of correlation that is less than a pre-defined threshold value;

excluding, in response to said determining, said factor from said plurality of factors to facilitate forming a subset of said plurality of factors, said subset including one or more factors, wherein an absolute value of a coefficient of correlation between any factor of said one or more factors and said UAM is greater than or equal to said pre-defined threshold value; and generating a regression model to predict an activity level, said regression model based on said plurality of activity levels and said subset, wherein said defining said plurality of factors comprises:
defining a first subset of said plurality of factors, said first subset including at least one factor, wherein said factor is included in said first subset, wherein each factor of said first subset is a measurable variable on which said UAM depends, wherein said measurable variable is not a calendar type factor for which each value of said plurality of values represents an amount of time elapsed from a specified event, and wherein said process further comprises:

assigning said plurality of activity levels to said UAM, said plurality of activity levels included in a plurality of sets of at least two activity levels, wherein each set of said at least two activity levels depends upon a factor of said plurality of factors, and is included in said plurality of activity levels, and wherein said plurality of activity levels is included in one set of said plurality of sets;

generating a first matrix of $x_{ij}$ elements, wherein $x_{ij}$ is a value of an i-th factor of said first subset measured at an end of a j-th time period of said plurality of time periods; and generating a second matrix including said first matrix, wherein said second matrix is a three dimensional matrix including $y_{ijk}$ elements, wherein $y_{ijk}$ is an (i,j,k)-th activity level assigned to said UAM, and included in a k-th set of said plurality of sets of at least two activity levels, said (i,j,k)-th activity level associated with said $x_{ij}$ and measured at an end of a (j+k)-th time period of said plurality of time periods, and wherein said second matrix includes elements $r_{ik}$, wherein $r_{ik}$ is an (i,k)-th coefficient of correlation between said i-th factor of said first subset and said k-th set, wherein said maximum coefficient of correlation is an absolute value of an element (r) included in a set of said elements $r_{ik}$, wherein said absolute value of said r is greater than or equal to an absolute value of any other element of said set of said elements $r_{ik}$, said r being associated with said factor and with a set of said plurality of sets of at least two activity levels, and wherein said maximum coefficient of correlation is associated with a time step K, wherein each activity level of said set of said plurality of sets is measured K units of time after an end of a period of time of said plurality of periods of time.

26. The method of claim 25, said process further comprising:

assigning one or more factor values to said one or more factors of said subset in a one-to-one correspondence, wherein each factor value of said one or more factor values is measured said K units of time before a start of a period of time during which said activity level is to occur; and calculating said activity level via said regression model, wherein said regression model is a multiple linear regression model utilizing said one or more factor values as input to predict said activity level during said period of time during which said activity level is to occur.

27. A computing system comprising a processor coupled to a computer-readable memory unit, said memory unit comprising a software application, said software application comprising instructions that when executed by said processor implement the method of claim 4.

28. A computer program product, comprising a computer-usable storage medium having a computer-readable program code embodied therein, said computer-readable program code comprising an algorithm adapted to implement the method of claim 4.

29. A computing system comprising a processor coupled to a computer-readable memory unit, said memory unit comprising a software application, said software application comprising instructions that when executed by said processor implement the method of claim 7.

30. A computer program product, comprising a computer-usable storage medium having a computer-readable program code embodied therein, said computer-readable program code comprising an algorithm adapted to implement the method of claim 7.

* * * * *